J. A. DAVIESS.
JOINT FOR STEAM CONVEYER CONDUITS.
APPLICATION FILED FEB. 12, 1917.
1,278,869.
Patented Sept. 17, 1918.
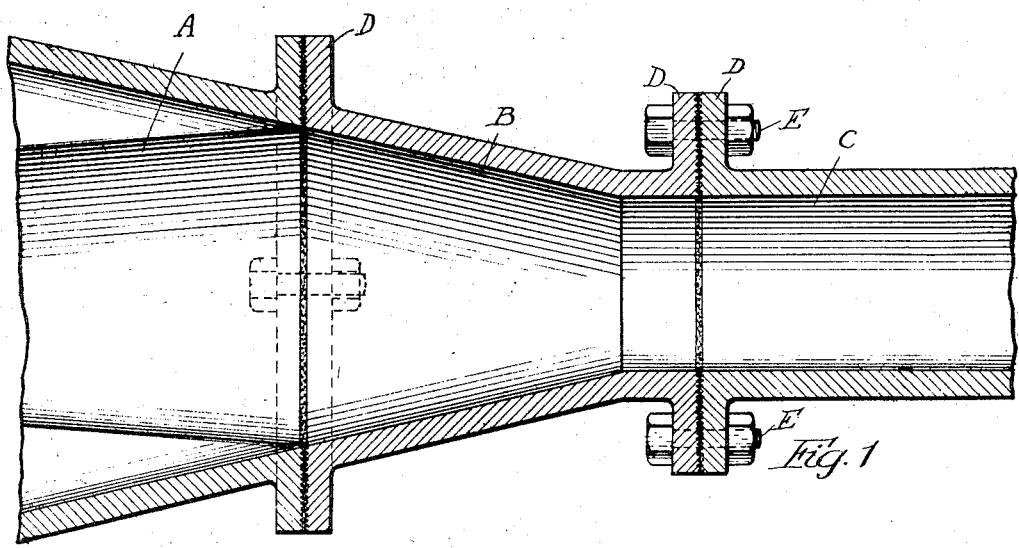
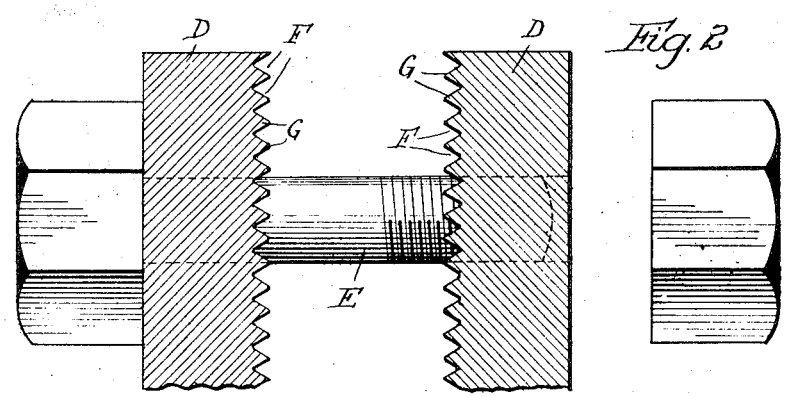
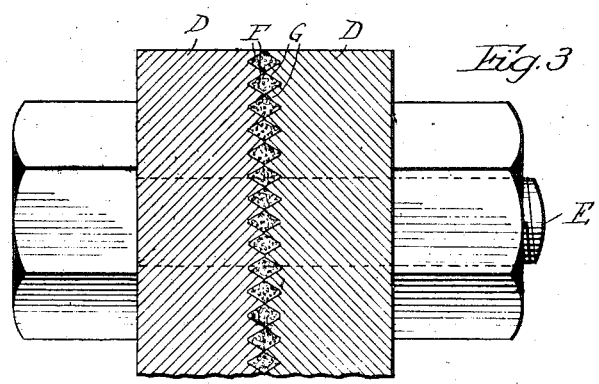
Witnesses:
Albine C. Ahlberg
Mary A. Cook
Inventor
James A. Daviess
By Williams Bradbury &c
Attorneys

UNITED STATES PATENT OFFICE.

JAMES A. DAVIESS, OF CHICAGO, ILLINOIS, ASSIGNOR TO AMERICAN STEAM CONVEYOR CORPORATION, OF CHICAGO, ILLINOIS, A CORPORATION OF NEW YORK.

JOINT FOR STEAM-CONVEYER CONDUITS.

1,278,869.  Specification of Letters Patent.  Patented Sept. 17, 1918.

Application filed February 12, 1917. Serial No. 148,186.

*To all whom it may concern:*

Be it known that I, JAMES A. DAVIESS, a citizen of the United States, residing at Chicago, in the county of Cook and State of Illinois, have invented a certain new and useful Improvement in Joints for Steam-Conveyer Conduits, of which the following is a full, clear, concise, and exact description, reference being had to the accompanying drawings, forming a part of this specification.

My invention relates to airtight and heat and moisture resisting joints and particularly to a form of joint suitable for use in ash conveyers of the type wherein steam under pressure is utilized as the medium for carrying the ashes through the conveyer conduit. The several sections in such a conveyer conduit are ordinarily in the form of heavy iron castings bolted together at the place of installation.

Prior to the advent of my invention hereinafter described and claimed the matter of preserving the airtight character of steam conveyer conduits has presented a serious problem to engineers engaged in this work; firstly, because of the comparatively great weight of fittings and pipe sections which go to make up the conduit; secondly, because of the practical impossibility of preventing the conduit sections from moving slightly one with respect to another, and thirdly, because of the nature of the material passing through the conduit—hot ashes and steam— it is a practical impossibility to preserve airtight joints between the several sections of the conduit by the use of gaskets or other similar means known in the past. Heretofore it has been the practice carefully to machine the abutting or engaging surfaces of the conduit sections and fittings so that when the several parts are bolted together a practically airtight conveyer conduit may be had. Although the joints thus obtained by machining the abutting surfaces of the pipe sections have been the best heretofore obtainable, these joints have been objectionable because of the cost of machining the abutting surfaces and the fact that slight movement of the conduit sections one with respect to another is apt to result in a leak at some point in the conduit.

My invention contemplates a form of joint particularly suitable for steam jet ash conveyers, wherein the joined sections need not have their abutting surfaces machined, the said abutting surfaces receiving their final shape and contour during the process of casting the sections. In attaining the object of my invention I prefer to cast each of the sections with attaching flanges having apertures therein to receive the bolts whereby juxtaposed sections of the conduit are fastened together. The abutting surfaces of the sections including the contiguous faces of connected flanges are cast to present a plurality of alternating grooves and ridges. Before the abutting surfaces of the flanges of connected sections are bolted or otherwise drawn together in assembling the conduit the abutting flange faces having the alternate grooves and ridges before mentioned are covered with a plastic composition comprising essentially asbestos fiber and Portland cement. The flanges are then drawn tightly together with the result that when the aforesaid composition hardens I have obtained a joint that is airtight, capable of successfully resisting the action of hot ashes, steam, and the moisture which invariably accumulates to a greater or less extent in a steam conveyer conduit.

My invention may be more clearly understood by referring to the accompanying drawings, wherein;

Figure 1 is a fragmentary sectional view of a steam conveyer conduit, the several sections of which are joined together in accordance with the teachings of my present invention;

Fig. 2 is a fragmentary sectional view illustrating two contiguous flanges in disassembled position, clearly to illustrate the alternate grooves and ridges therein, and Fig. 3 is a view similar to Fig. 2 but showing the flanges drawn together with the plastic composition of asbestos fiber and Portland cement between them.

Similar characters of reference refer to similar parts throughout the several views.

In Fig. 1 I have illustrated a steam conveyer conduit comprising a plurality of cast iron sections, A, B and C, joined together in accordance with my invention. Cast integral with the conduit sections are the attaching flanges D—D arranged to abut one against another as shown. Each of the flanges D—D is provided with a plurality of apertures which register with apertures in the abutting flange when the conduit is assembled and which are adapted to receive bolts E—E as shown.

Referring now to Fig. 3, it will be seen that the contacting or abutting faces of the flanges D—D are cast to present a plurality of alternate grooves and ridges indicated respectively at F—F and G—G. In Fig. 2 the sections are shown ready for assembling. Before the sections are drawn together the grooved or scored faces of the flanges D—D are coated with a plastic composition consisting essentially of two-thirds asbestos fiber and one-third Portland cement mixed with water to substantially the consistency of putty. The flanges D—D are then drawn up as shown in Fig. 3 and the nuts tightened on bolts E—E to secure the flanges together with the composition of asbestos fiber and Portland cement filling the grooves F—F and occupying such spaces as there may be between the abutting flanges. I find that after the aforesaid composition has hardened I have attained a joint that is absolutely airtight and capable of resisting the action of moisture, hot ashes, and steam. Moreover, the joint is slightly flexible, that is, if the connected conduit sections move slightly one with respect to another the composition filling the interstices of the scored flange faces prevents the joint from leaking.

These characteristics of my improved joint render it particularly adapted for use in ash conveyer systems of the steam jet type, and I have therefore described the joint as used in such a system, although I am aware that it may have many other uses.

Having thus described my invention what I claim as new and desire to secure by Letters Patent of the United States is:

1. A joint for ash conveyer conduits comprising a pair of conduit sections provided with opposing flanges, a plurality of ridges cast on the face of each of said flanges, means for drawing said flanges one toward the other and a composition of asbestos fiber and Portland cement filling the spaces between said ridges.

2. A joint of the class described comprising in combination a pair of conduit sections, opposing flanges for said sections, a plurality of alternate grooves and ridges formed in the contiguous faces of said flanges, means for drawing said flanges one toward the other, and a composition containing asbestos and Portland cement disposed between said flanges and filling said grooves.

3. A joint of the class described comprising in combination a pair of conduit sections, opposing flanges for said sections, a plurality of alternate grooves and ridges formed in the contiguous faces of said flanges, means for drawing said flanges one toward the other, and an initially plastic composition of asbestos and Portland cement disposed between said flanges and filling said grooves.

4. A joint of the class described comprising two members having opposing flanges, a plurality of grooves formed in the contiguous faces of said flanges, means for drawing said flanges one toward the other and a composition consisting of asbestos fiber and Portland cement between said flanges and filling said grooves.

5. A joint of the class described comprising two members having opposing flanges, a plurality of grooves formed in the contiguous faces of said flanges, means for drawing said flanges one toward the other, and an initially plastic cementitious composition including asbestos between said flanges and filling said grooves.

6. A joint of the class described comprising two members having opposing flanges, a plurality of grooves formed in the contiguous faces of said flanges, means for drawing said flanges one toward the other, and a fireproof cementitious fibrous composition between said flanges and filling said grooves.

7. A joint of the class described comprising in combination two members having opposing flanges, means for drawing said flanges one toward the other, one of said flanges having a plurality of alternate grooves and ridges therein and a cementitious composition including asbestos fiber disposed between said flanges and filling said grooves.

8. A joint of the class described comprising a pair of members having opposing flanges, means for drawing said flanges together, and a packing between said flanges comprising a fibrous material and a cementitious granular material for closing the interstices of the fibrous material.

In witness whereof, I hereunto subscribe my name this 24th day of January, A. D. 1917.

JAMES A. DAVIESS.

Witnesses:
A. G. McCaleb,
Albin C. Ahlberg.